(12) United States Patent
Kimori

(10) Patent No.: US 8,307,954 B2
(45) Date of Patent: Nov. 13, 2012

(54) CALIPER BRAKE ATTACHMENT TOOL FOR REAR WHEEL OF BICYCLE

(75) Inventor: Toshiyuki Kimori, Konan (JP)

(73) Assignee: Kimori Limited, Shiga (JP)

( * ) Notice: Subject to any disclaimer, the term of this patent is extended or adjusted under 35 U.S.C. 154(b) by 1230 days.

(21) Appl. No.: 11/899,324

(22) Filed: Sep. 5, 2007

(65) Prior Publication Data

US 2009/0057071 A1 Mar. 5, 2009

(51) Int. Cl.
*B62L 1/06* (2006.01)
(52) U.S. Cl. ............. 188/24.19; 188/24.22; 188/26; 188/24.11; 188/24.13; 188/24.15
(58) Field of Classification Search ........... 188/24.19, 188/24.22, 26, 24.11, 24.13, 24.15
See application file for complete search history.

(56) References Cited

U.S. PATENT DOCUMENTS

| 524,527 | A | * | 8/1894 | Hall | 188/24.11 |
| 3,117,653 | A | * | 1/1964 | Altherr | 188/29 |
| 3,486,586 | A | * | 12/1969 | Grier, Jr. | 188/24.17 |
| 3,989,124 | A | * | 11/1976 | Fujii | 188/26 |
| 4,489,813 | A | * | 12/1984 | Albonico | 188/24.21 |
| 4,511,018 | A | * | 4/1985 | Scott | 188/24.12 |
| 4,558,765 | A | * | 12/1985 | Hogan | 188/24.19 |
| 4,624,151 | A | * | 11/1986 | Huret | 74/491 |
| 4,823,917 | A | * | 4/1989 | Kenny | 188/24.19 |
| 5,129,665 | A | * | 7/1992 | Sutter et al. | 280/274 |
| 5,199,534 | A | * | 4/1993 | Goff | 188/74 |
| 5,293,964 | A | * | 3/1994 | Li | 188/24.19 |
| 5,411,280 | A | * | 5/1995 | Allsop et al. | 280/281.1 |
| 5,413,193 | A | * | 5/1995 | Miller | 188/24.19 |
| 5,484,032 | A | * | 1/1996 | Li | 188/24.21 |
| 5,775,466 | A | * | 7/1998 | Banyas et al. | 188/24.21 |
| 5,901,974 | A | * | 5/1999 | Busby et al. | 280/284 |
| 5,957,244 | A | * | 9/1999 | Turner | 188/26 |
| 5,979,609 | A | * | 11/1999 | Tsai | 188/26 |
| 6,079,522 | A | * | 6/2000 | Valdez | 188/24.19 |
| 6,572,131 | B2 | * | 6/2003 | Fujii | 280/274 |
| 6,921,226 | B2 | * | 7/2005 | Rundle et al. | 403/77 |
| 7,458,443 | B2 | * | 12/2008 | Givonetti | 188/24.11 |
| 2010/0187048 | A1 | * | 7/2010 | Chandler | 188/26 |

FOREIGN PATENT DOCUMENTS

| JP | 50-97151 | 8/1975 |
| JP | 4-110290 | 4/1992 |

* cited by examiner

*Primary Examiner* — Robert A Siconolfi
*Assistant Examiner* — James Hsiao
(74) *Attorney, Agent, or Firm* — Karl F. Milde, Jr.; Eckert Seamans Cherin & Mellott, LLC

(57) ABSTRACT

There is provided a caliper brake attachment tool which comprises: a supporting rod; a fixed part provided to one end side of the supporting rod capable of fixing an existing caliper brake; an applying part provided to the other end side of the supporting rod and applicable to a seat tube of the bicycle; and an engaging recess provided between the fixed part and the applying part in the supporting rod engageable with a bridge to connect a right-and-left pair of seat stays of the bicycle.

7 Claims, 10 Drawing Sheets

CALIPER BRAKE ATTACHMENT TOOL FOR REAR WHEEL OF BICYCLE

BACKGROUND OF THE INVENTION

1. Field of the Invention

The present invention relates to a caliper brake attachment tool for attachably and detachably attaching a caliper brake for rear wheel braking to a bicycle.

2. Description of Related Art

As generally known, caliper brakes are used as one of brake devices for bicycles. As shown in FIG. 9, a caliper brake or brake assembly 100 comprises: a right-and-left pair of arms 102 having an attaching bolt 101 pivotally coupled as a shaft; brake shoes 103 provided to lower ends of each of the arms 102; and a spring 104 for biasing each of the arms 102 in such a manner that the space of respective brake 103 is widened. The pair of arms 102 are pivoted against a biasing force of the spring 104 via a brake wire not shown by operating a brake lever to press the right-and-left brake shoes 103 to both sides of the rim of the wheel, resulting in brake control of the rotation of the wheel.

Conventionally, when attaching a caliper brake for rear wheel braking to a bicycle, as shown in FIGS. 10 and 11, an attaching bolt 101 of a caliper brake 100 has been inserted into a through-hole 221 for a bridge 220 to couple a right-and-left pair of seat stays 210 of a bicycle 200 and a fixed nut 105 has been screwed together with the attaching bolt 101 from the opposite side to be fastened. Further, the reference numeral 230 shown in the figure designates a seat tube of the bicycle and the reference numeral 240 shown in the figure designates a rear wheel of the bicycle. The invention disclosed in the Japanese Utility Model publication No. 50-97151 is known as other method for attaching a caliper brake.

However, such a conventional method for attaching a caliper brake had such disadvantages that the attaching bolt 101 itself rotated along with the rotation of the fixed nut 105 when fastening the fixed nut 105, so that it was time-consuming to fasten the fixed nut 105 while adjusting the position of the brake shoes 103 to be placed at regular intervals right and left relative to the rim.

When the caliper brake 100 attached to the bicycle 200 by the position adjustment was temporally removed from the bicycle 200 for maintenance or the like, it was very troublesome to readjust the position, even if the same brake was attached to the same bicycle.

In view of the aforementioned drawbacks in the conventional method for attaching a caliper brake for rear wheel braking, it is an object of the present invention to provide a caliper brake attachment tool which is extremely easy to attach an existing caliper brake for rear wheel braking to a bicycle. It is another object of the present invention to provide a caliper brake attachment tool which does not need to adjust the position every time the brake is attached by simply adjusting the position of the caliper brake relative to the bicycle.

SUMMARY OF THE INVENTION

In a first preferred embodiment, a caliper brake attachment tool for attachably and detachably attaching a caliper brake for a rear wheel to a bicycle comprises: a supporting rod; a fixed part provided to one end side of the supporting rod capable of fixing the caliper brake; an applying part provided to the other end side of the supporting rod and applicable to a seat tube of the bicycle; and an engaging recess provided between the fixed part and the applying part in the supporting rod and engageable with a bridge to connect a right-and-left pair of seat stays of the bicycle.

In a second preferred embodiment, the supporting rod has a rod length adjusting means which may change the distance between the applying part and the engaging recess.

In a third preferred embodiment, the applying part has a pair of embracing pieces for embracing the seat tube of the bicycle.

In a fourth preferred embodiment, the attachment tool further comprises an embracing space adjusting means which may change the space between the pair of embracing pieces.

In the caliper brake attachment tool, a caliper brake is easily attachable to the bicycle by simply engaging the engaging recess with the bridge of the bicycle and then applying the applying part to the seat tube.

In addition, it is possible to determine the position in a lateral direction of the caliper brake relative to the bicycle by securely engaging the engaging recess with the bridge and applying the applying part to the seat tube. Accordingly, once the position adjustment of the caliper brake relative to the bicycle is made, readjusting the position of the brake every time the caliper brake is attached is not needed.

For a full understanding of the present invention, reference should now be made to the following detailed description of the preferred embodiments of the invention as illustrated in the accompanying drawings.

BRIEF DESCRIPTION OF THE DRAWINGS

FIG. 1 (a) is a side view and FIG. 1 (b) is a plan view.

DESCRIPTION OF THE PREFERRED EMBODIMENTS

Figure 1:
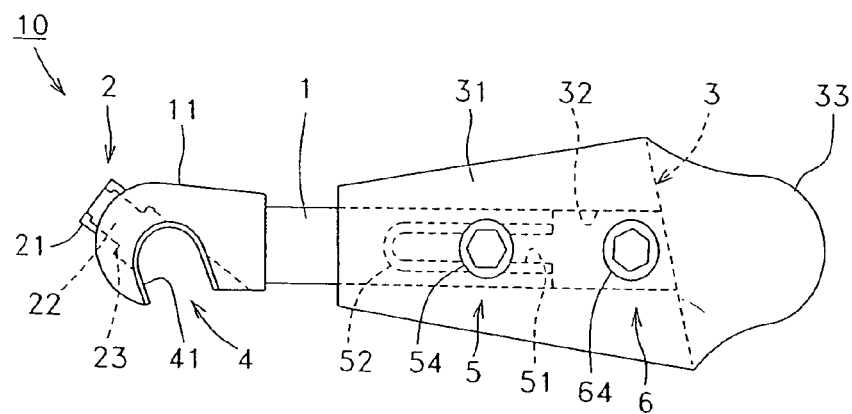
FIGS. 1 (a) and 1 (b) are respectively an overall view of a caliper brake attachment tool according to one embodiment of the present invention.
Figure 1:
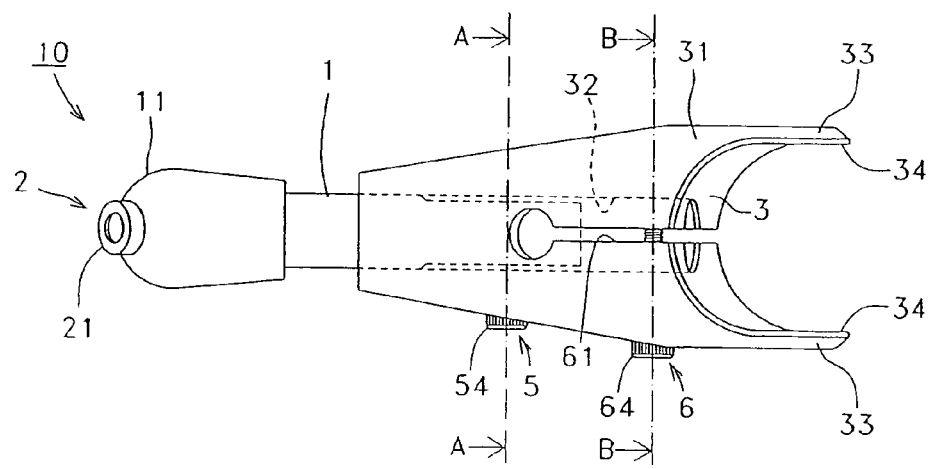
Figure 3:
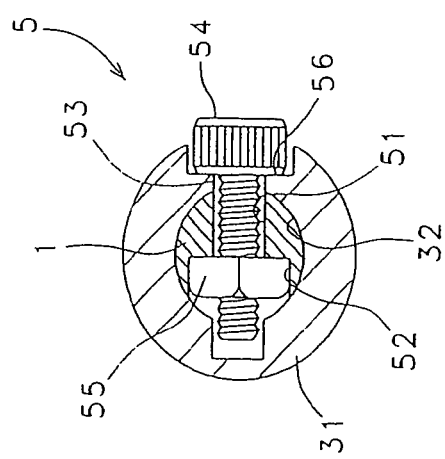
FIG. 3 is a cross sectional view taken on line B-B of FIG. 1 (b).

The preferred embodiments of the present invention will now be described with reference to FIGS. 1-7 of the drawings. Identical elements in the various figures are designated with the same reference numerals.

In one embodiment of the present invention as shown in FIGS. 1 (a) and 1 (b), a caliper brake attachment tool 10 comprises: a rod-shaped supporting rod 1; a fixed or attachment part 2 provided to one end side of the supporting rod 1 capable of fixing an existing caliper brake; an applying or engagement part 3 provided to the ether end side of the supporting rod 1 applicable to a seat tube of the an bicycle; an engaging recess 4 provided between the fixed part 2 and the applying part 3 in the supporting rod 1 and engageable with a bridge to connect a right-and-left pair of seat stays of the bicycle; a rod length adjusting means 5 for changing the distance between the engaging recess 4 and the applying part 3; and an embracing space adjusting means 6 for changing the space between a pair of embracing pieces 33 provided to the applying part 3.

The supporting rod 1 is made of aluminum material in the shape of a round bar, wherein a substantially hemispheric shaped head 11 is formed at one end and a slot 51 of the rod length adjusting means 5 is formed along a longitudinal direction (axial direction) at the other end side.

Figure 4:
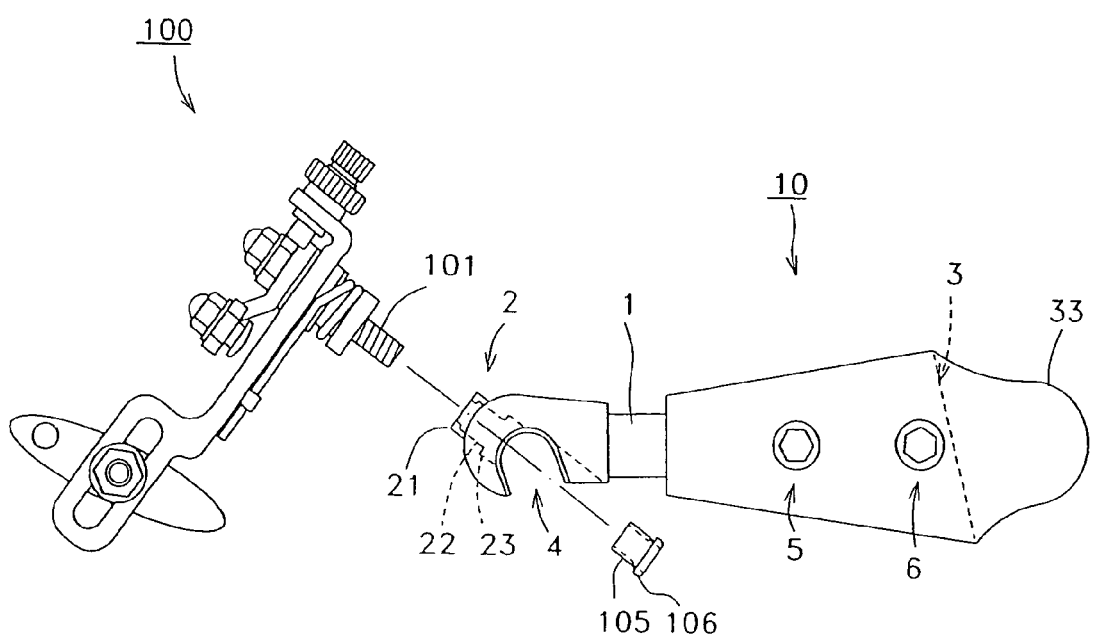
FIG. 4 is a side view illustrating procedures for attaching a caliper brake using a caliper brake attachment tool according to another embodiment of the present invention.
Figure 5:
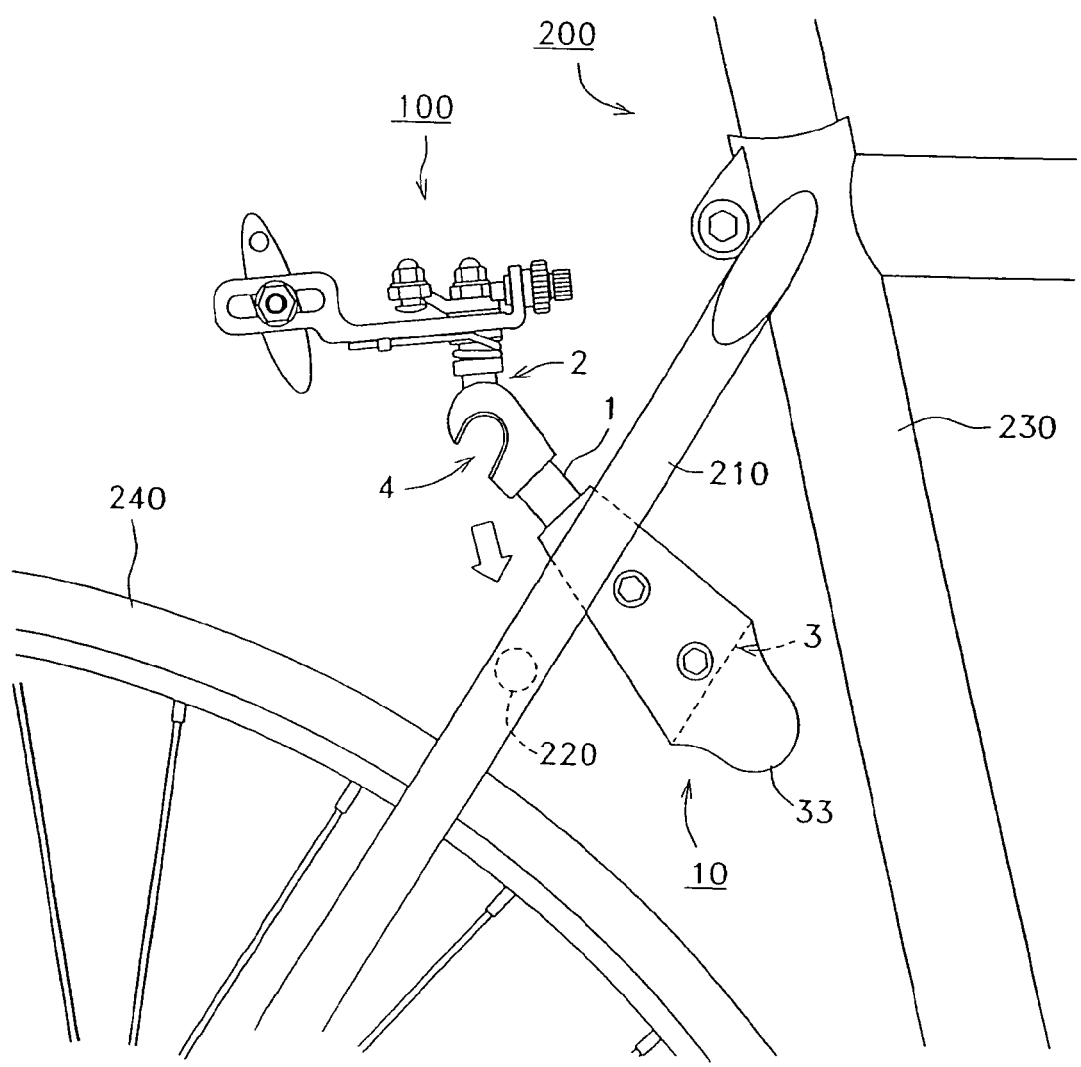
FIG. 5 is a side view illustrating procedures for attaching the caliper brake using the caliper brake attachment tool according to still another embodiment of the present invention.

The fixed part 2 comprises: a cylindrical fixed seat 21 whose shaft center is obliquely provided relative to the axial direction of the supporting rod 1; a fixed hole 22 for passing through the fixed seat 21 and the head 11; and a step 23 formed in the fixed hole 22. As shown in FIG. 4, an attaching bolt 101 for an existing caliper brake 100 is inserted into the fixed hole 22 in the fixed part 2 and then a fixed nut 105 is screwed together from the opposite side to fasten a diameter expansive part 106 of the fixed nut 105 by engaging with the step 23 of the fixed hole 22. In such a way, as shown in FIG. 5, the existing caliper brake 100 is easily attachable to the fixed part 2 in the caliper brake attachment tool 10. In the caliper brake attachment tool 10 according to this embodiment, the caliper brake 100 is previously fixed to the fixed part 2 to attach to and detach from a bicycle 200 in the state that the caliper brake attachment tool 10 is integrated with the caliper brake 100.

As shown in FIGS. 1 (a) and 1 (b), the applying part 3 is formed at an end of an applying part body 31 made of substantially circular truncated cone-shaped aluminum material provided to the other end side of the supporting rod 1. In the applying part body 31, an inserting hole 32 is formed in the axial direction, in which the other end side of the supporting rod 1 is slide-movably inserted. The applying part body 31 is fixed to a desired position at the other end side of the supporting rod 1 by the rod length adjusting means 5.

Further, the applying part 3 according to this embodiment is formed in a recessed and curved surface shape so as to come into intimate contact with the cylindrical seat tube of the bicycle. When the applying part 3 is applied to the seat tube, a pair of embracing pieces 33 for embracing the seat tube by coming into contact with both sides of the seat tube are integrally provided to both ends of the applying part 3. In one embodiment of the present invention, thin layers 34 made of polyurethane rubber are bonded from the applying part 3 in the recessed and curved surface shape to each of inner surfaces of the pair of embracing pieces 33, which lead to improvement in mounting stability of the caliper brake attachment tool 10 to the bicycle using friction resistance between the thin layers 34 and the seat tube, as well as preventing of the seat tube from being damaged by the application of the applying part 3 and the embracing of the embracing pieces 33.

The engaging recess 4 is formed in the head 11 of the supporting rod 1. In the engaging recess 4 according to this embodiment, its back part is formed in the shape of a recessed and curved surface so that the engaging recess 4 can tightly engage with the bridge of the seat stays of the bicycle. A thin layer 41 made of polyurethane rubber is bonded inside the engaging recess 4, resulting in improvement in mounting stability of the caliper brake attachment tool 10 to the bicycle using friction resistance between the thin layer 41 and the bridge, as well as preventing of the bridge from being damaged by the engaging of the engaging recess 4.

As shown in FIGS. 1 (a), 1 (b) and 2, the rod length adjusting means 5 comprises: the slot 51 formed at the other end side of the supporting rod 1; a slide recess 52 formed on the supporting rod 1 along the slot 51; a lock hole 53 formed from the outer surface of the applying part body 31 to the inserting hole 32; a lock bolt 54 whose screw is threaded into the lock hole 53 and the slot 51; and a lock nut 55 screwed into a lock bolt 54 in the inserting hole 32. The lock nut 55 composed of a known hexagon nut is engaged with the slide recess 52, so that the lock nut 55 is not capable of rotating, although the slide recess 52 can make a slide movement toward the axial direction.

Figure 2:
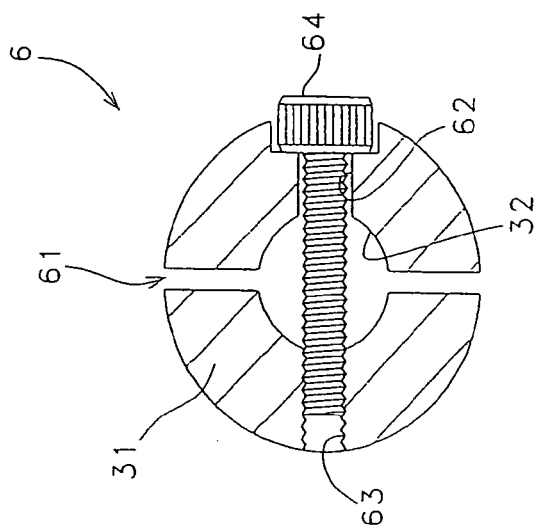
FIG. 2 is a cross sectional view taken on line A-A of FIG. 1 (b).

It is possible to allow the applying part body 31 to make a slide movement along the axial direction by loosening the lock bolt 54 of the rod length adjusting means 5 when needed. And the applying part body 31 can be fixed at a desired position of the supporting rod 1 by fastening the lock bolt 54. As mentioned above, the operation of the rod length adjustment means 5 makes it possible to optionally change and adjust the distance between the engaging recess 4 formed in the head 11 of the supporting rod 1 and the applying part 3 formed in the applying part body 31, if necessary. In the rod length adjusting means 5 according to the present invention, as shown in FIG. 2, when the lock bolt 54 is fastened, the diameter expansive head of the lock bolt 54 is in contact with the surface of a step 56 formed in an opening part of the lock hole 53 and simultaneously, the lock nut 55 is in contact with the surface of the bottom of the slide recess 52. Accordingly, there is no possibility of the applying part body 31 being displaced by rotating around the axis of the supporting rod 1 before and after the rod length adjustment.

As shown in FIGS. 1 (a), 1 (b), and 3, the embracing space adjusting means 6 comprises: top-and-bottom slitting parts 61 formed from the middle part of the applying part body 31 to the applying part 3 so that the end of the applying part body 31 can be divided in two; a threaded hole 62 formed in one of the applying part bodies 31 divided in two; a screw hole 63 formed in the other applying part body 31 divided in two; and an adjusting bolt 64 screwed into the screw hole 63. When the adjusting bolt 64 of the embracing space adjusting means 6 is fastened, the space of the slitting parts 61 will be narrowed, resulting in the narrowing of the space between the pair of embracing pieces 33 provided on both ends of the applying part 3.

The mounting procedures of a caliper brake 100 for a rear wheel using the caliper brake attachment tool 10 according to this embodiment will now be explained by referring to the FIGS. 4 to 7 as below.

First, as shown in FIG. 4, the caliper brake 100 to be attached to the bicycle is previously fixed to the fixed part 2 of the caliper brake attachment tool 10. Secondly, as shown in FIG. 5, the caliper brake attachment tool 10 integrated with the caliper brake 100 is inserted into a right-and-left pair of seat stays 210 of a bicycle 200 and the engaging recess 4 is engaged with a bridge 220 of the bicycle 200 so as to be covered from upwardly.

Figure 6:
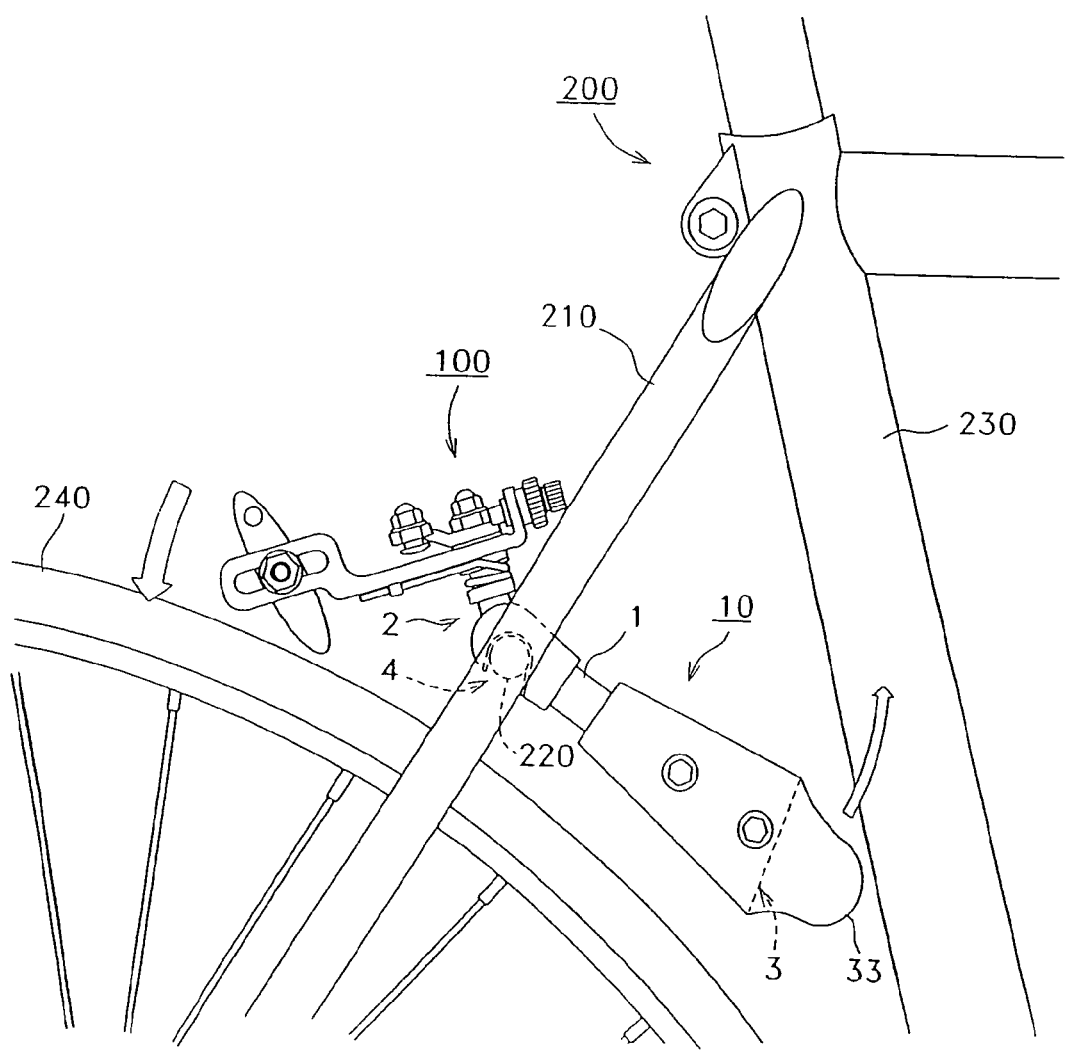
FIG. 6 is a side view illustrating procedures for attaching the caliper brake using the caliper brake attachment tool according to a further embodiment of the present invention.

As shown in FIG. 6, the applying part 3 of the caliper brake attachment tool 10 is lifted upwardly while engaging the engaging recess 4 with the bridge 220, and the applying part 3 is tightly applied to a seat tube 230, at the same time the seat tube 230 is held by a pair of embracing pieces 33.

Figure 7:
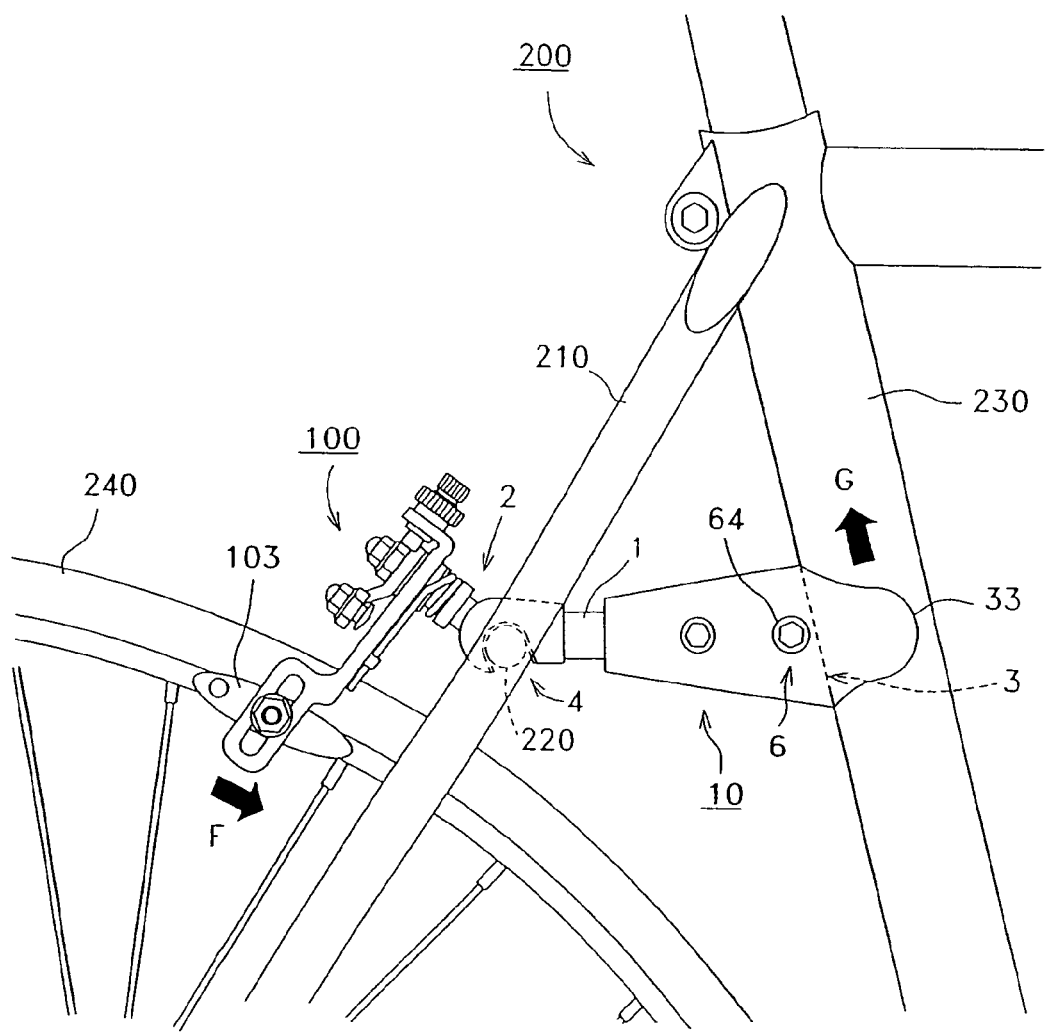
FIG. 7 is a side view illustrating the state of attaching the caliper brake using the caliper brake attachment tool according to still further embodiment of the present invention.

In this way, as shown in FIG. 7, friction force generated by the protrusion of the supporting rod 1 between the applying part 3 and the seat tube 230 acts by the application of the applying part 3 to the seat tube 230 in the state that the engaging recess 4 of the caliper brake attachment tool 10 is engaged with the bridge 220, resulting in the secure attachment of the caliper brake 100 for braking the rear wheel 240 to the bicycle 200.

In addition, as shown in FIG. 7, force F applied to a brake shoe 103 of the caliper brake 100 acts in a direction that makes the engagement between the engaging recess 4 and the bridge 220 more secured during the braking of the rear wheel 240. And the force F is transmitted as force G for further lifting the applying part 3 using the engaging recess 4 as a supporting point. Therefore, according to the caliper brake attachment tool 10, mounting stability is excellent as well when braking the running of the bicycle 200.

As mentioned above, according to the caliper brake attachment tool 10 of this embodiment, it will become possible to easily attach the caliper brake 100 for rear wheel braking to the bicycle 200 by simply applying the applying part 3 to the seat tube 230 after engaging the engaging recess 4 with the bridge 220, so that unlike the conventional one, the attachment is not time-consuming.

According to the caliper brake attachment tool 10 of this embodiment, when the engagement of the engaging recess 4 is displaced in a lateral direction in the bridge 220, it is not possible to securely applying the applying part 3 relative to the seat tube 230, so that the displacement of the engaging work of the engaging recess 4 can be easily recognized, resulting in easy amendments. More specifically, in the caliper brake tool 10, the position in the lateral direction of the caliper brake 100 relative to the bicycle 200 can be determined by simply engaging the engaging recess 4 with the bridge 220 firmly and securely applying the applying part 3 to the seat tube 230. Accordingly, once the position adjustment of the caliper brake 100 relative to the bicycle is performed, it is not needed to readjust the position of the brake every time the caliper brake 100 is attached.

In the caliper brake attachment tool 10 according to this embodiment, the caliper brake 100 is attached by engaging the engaging recess 4 with the bridge 220, so that, for example, like a bicycle for bicycle race, it is possible to easily attach an existing caliper brake to a bicycle, even if the bicycle has no threaded hole for inserting an attaching bolt of the caliper brake into the bridge. Of course, it is possible to attach an existing caliper brake to a common bicycle having a threaded hole for inserting the attaching bolt of the caliper brake into the bridge. Furthermore, the existing caliper brake can also be attached to a bicycle having a threaded hole for attaching a cantilever brake of the bicycle to the seat stays of the bicycle.

In the caliper brake attachment tool 10 of this embodiment, the distance between the applying part 3 and the engaging recess 4 can be optionally adjusted in accordance with the space between the seat tube and the bridge of the bicycle to which the caliper brake is to be attached because of having the rod length adjusting means 5, which leads to excellent general versatility.

In the caliper brake attachment tool 10 according to this embodiment, the pair of embracing pieces 33 for embracing the seat tube 230 are equipped with the applying part 3, so that the state of applying the applying part 3 relative to the seat tube 230 can be maintained more steadily. In addition, mounting stability can be raised by using friction resistance between each embracing piece 33 and the seat tube 230.

In the caliper brake attachment tool 10 according to this embodiment, fastening of the adjusting bolt 64 makes it possible to positively press the seat tube 230 by sandwiching the seat tube 230 with a pair of embracing pieces 33 after applying the applying part 3 to the seat tube 230 because the embracing space adjusting means 6 is equipped with the caliper brake attachment tool 10. This enables to attach the caliper brake 100 to the bicycle 200 steadily. Since the fastening of the adjusting bolt 64 can be performed independently from the position adjustment of the caliper brake 100, it does not take long to fasten the adjusting bolt 64.

While preferred embodiments of the present invention have been described, the present invention may be made in other embodiments.

For example, in the aforementioned embodiment, while the applying part 3 is formed on an end of the applying part body 31 arranged slide-movably on the supporting rod 1, it is to be understood that the present invention is not limited to this embodiment but may be integrally formed at the other end of the supporting rod 1. The applying part 3 is not necessarily needed to be formed in the recessed and curved shape in the cylindrical inner surface state but may be formed in a fork state. Although the applying part 3 preferably has a recess to securely apply to the seat tube in a rod shape, various design changes are possible in view of mounting operability of the caliper brake and designs of the whole attachment tool or the like. In the aforementioned embodiments, while the embracing pieces 33 are provided to the applying part 3, that is not necessarily needed, if only the applying part 3 can be securely applied to the seat tube.

Figure 8:
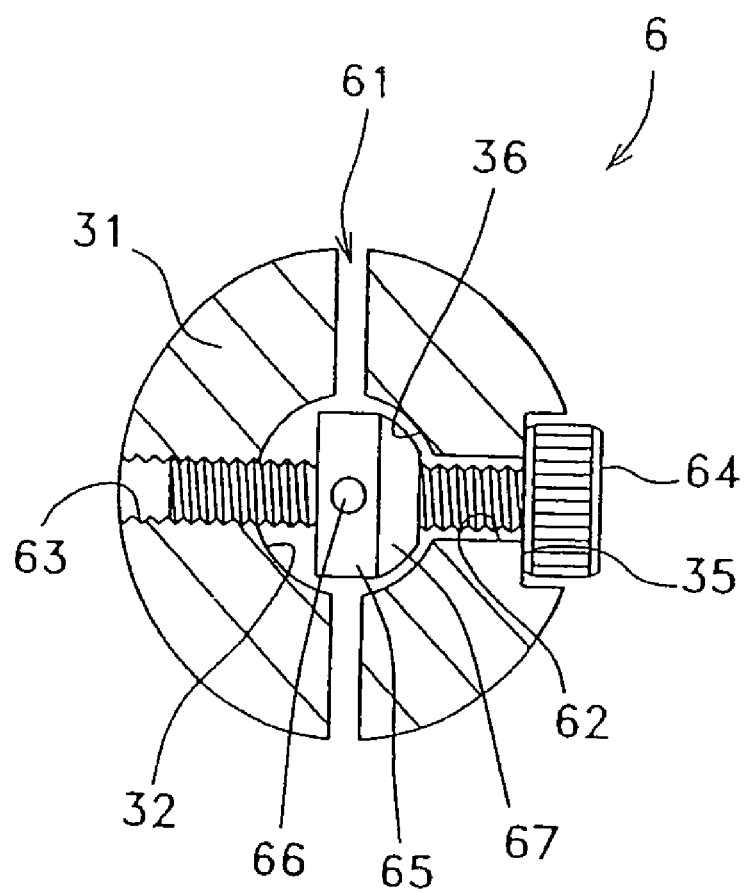
FIG. 8 is a cross sectional view of the caliper brake attachment tool in a modification of the present invention.
Figure 9:
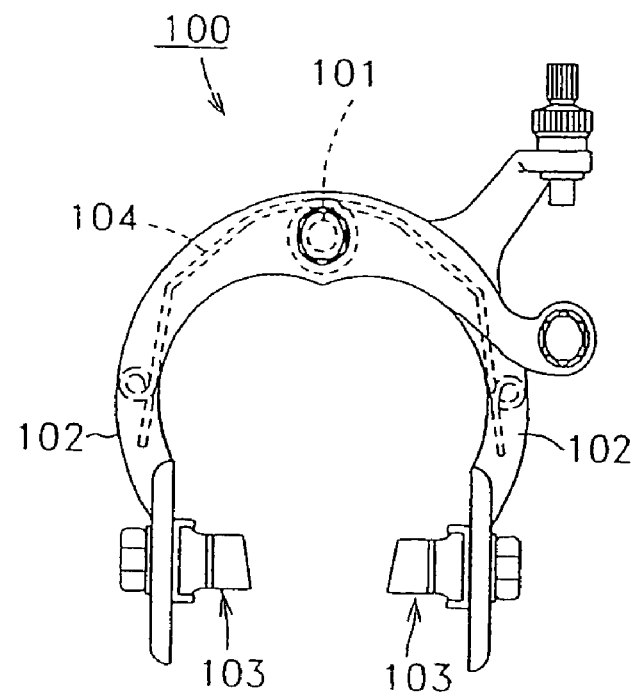
FIG. 9 is a front view of a conventional caliper brake.
Figure 10:
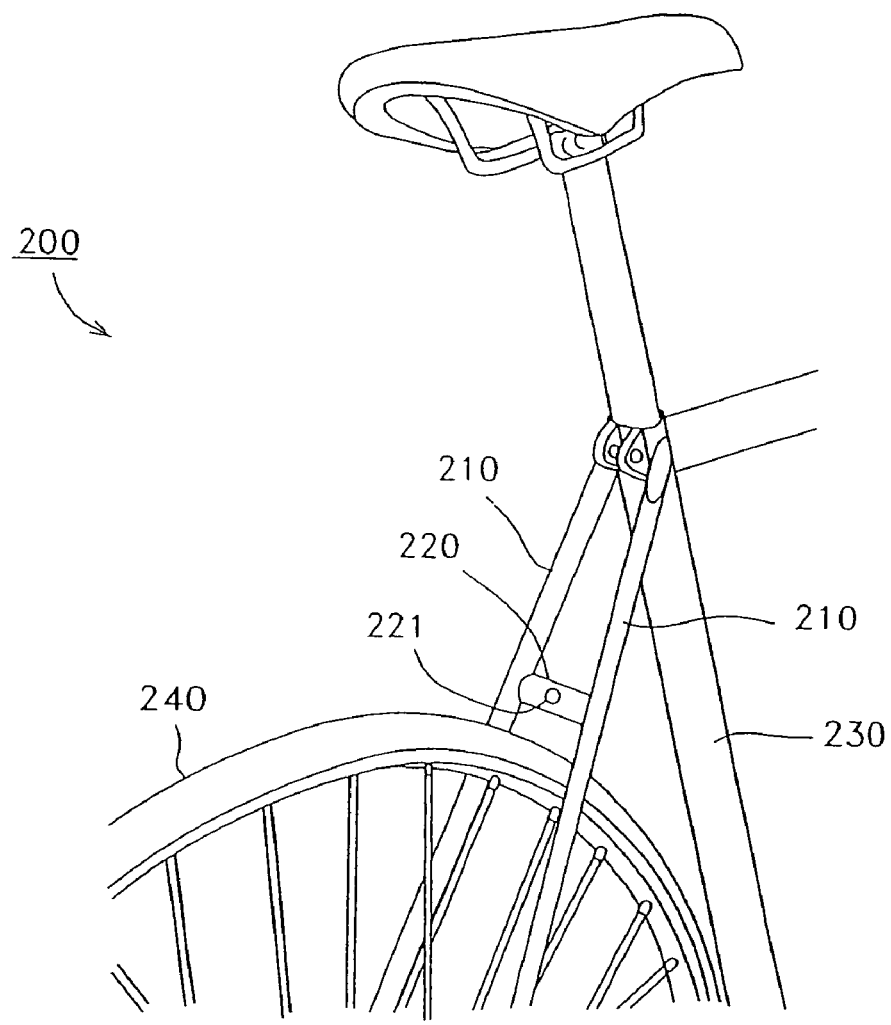
FIG. 10 is a fragmentary perspective view showing a bridge to connect a pair of seat stays for a conventional bicycle.
Figure 11:
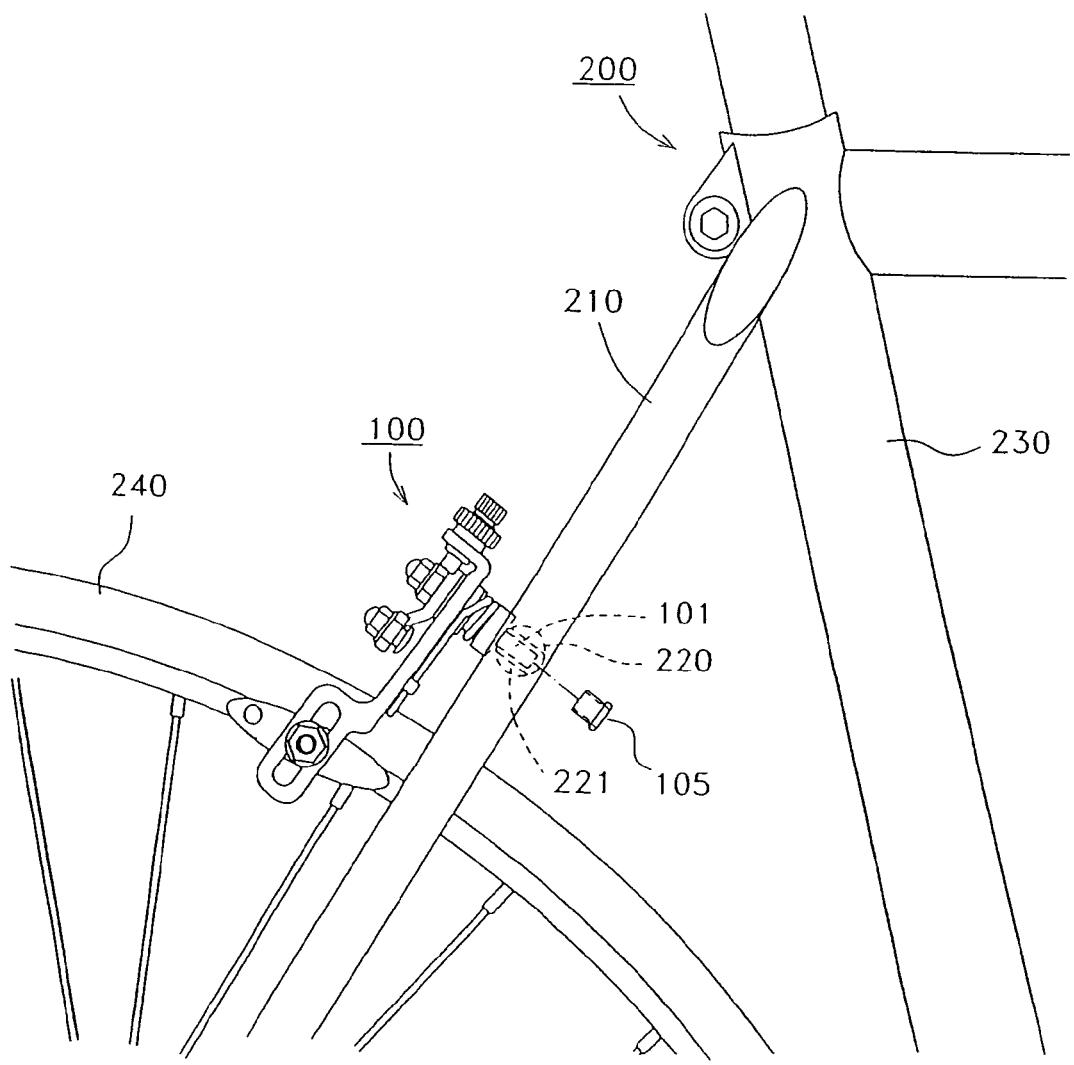
FIG. 11 is a fragmentary side view illustrating the state of attaching a conventional caliper brake for rear wheel braking to a bicycle.

As shown in FIG. 8, a bridge piece 65 may be fixed in the screw of the adjusting bolt 64 of the embracing space adjusting means 6. That is, the bridge piece 65 is screwed into the screw of the adjusting bolt 64 in the inserting hole 32 in the applying part body 31 to be fixed in the middle of the screw of the adjusting bolt 64 with a lock screw 66. Screwing the adjusting bolt 64 into the screw hole 63 by rotating the adjusting bolt 64 of the embracing space adjusting means 6 in a clockwise direction makes the head of the adjusting bolt 64 push one outer surface 35 of the applying part body 31. As a result, the space of the slitting parts 61 can be narrowed, resulting in narrowing of the pair of embracing pieces 33. A tip 67 substantially in a spheric shape of the bridge piece 65 presses one inner surface 36 in the inserting hole 32 of the applying part body 31 by rotating the adjusting bolt 64 in an anti-clockwise direction, so that the space of the slitting parts 61 can be widened, resulting in widening of the space between the pair of embracing pieces 33.

It is to be understood that the present invention may be practiced in other embodiments in which various improvements, modifications, and variations are added on the basis of knowledge of those skilled in the art without departing from the spirit of the present invention. Further, any of the specific inventive aspects of the present invention may be replaced with other technical equivalents for embodiment of the present invention, as long as the effects and advantages intended by the invention can be insured. Alternatively, the integrally configured inventive aspects of the present invention may comprise a plurality of members and the inventive aspects that comprise a plurality of members may be practiced in a integrally configured manner.

There has thus been shown and described a novel caliper brake attachment tool for rear wheel of bicycle which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A caliper brake attachment tool for attachably and detachably attaching a caliper brake assembly for a rear wheel to a bicycle, said bicycle having a seat tube supporting a seat, a pair of seat stays extending downward from the seat tube to a rear axle on opposite sides of a rear wheel, and a cylindrical bridge extending horizontally and interconnecting said seat stays above said rear wheel, said caliper brake attachment comprising:

a supporting rod having two ends;
   an attachment part, provided at one end of the supporting rod, which attachment part is configured to attach to and support the caliper brake assembly;
   an engagement part provided at an opposite end of the supporting rod, said engagement part being configured to contact rearward and lateral surfaces only of the seat tube; and
   an engaging recess, provided in the supporting rod between the attachment part and the engagement part, said engaging recess being configured to contact and engage upper and lateral surfaces only of the horizontal bridge.

2. The tool according to claim 1, wherein the supporting rod has a rod length adjusting means for changing the distance between the engagement part and the engaging recess.

3. The tool according to claim 1, wherein the engagement part has a pair of embracing pieces for embracing the seat tube of the bicycle.

4. The tool according to claim 2, wherein the engagement part has a pair of embracing pieces for embracing the seat tube of the bicycle.

5. The tool according to claim 3, further comprising an embracing space adjusting means for changing the space between the pair of embracing pieces.

6. The tool according to claim 4, further comprising an embracing space adjusting means for changing the space between the pair of embracing pieces.

7. A caliper brake assembly system for a bike, which comprises a caliper brake assembly attached to a caliper brake attachment tool of claim 1.

\* \* \* \* \*